United States Patent
Krishnamurthy (10) Patent No.: US 8,706,901 B2
(45) Date of Patent: Apr. 22, 2014

(54) PROTOCOLS FOR HIGH PERFORMANCE COMPUTING VISUALIZATION, COMPUTATIONAL STEERING AND FORWARD PROGRESS

(75) Inventor: Rajaram B. Krishnamurthy, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 104 days.

(21) Appl. No.: 12/422,422

(22) Filed: Apr. 13, 2009

(65) Prior Publication Data
US 2010/0262882 A1 Oct. 14, 2010

(51) Int. Cl.
G06F 15/16 (2006.01)
G01R 31/08 (2006.01)

(52) U.S. Cl.
USPC .......................................... 709/234; 370/216

(58) Field of Classification Search
USPC ............................ 709/230–235; 370/232–237
See application file for complete search history.

(56) References Cited

U.S. PATENT DOCUMENTS

| 6,272,550 B1 | 8/2001 | Deng et al. |
|---|---|---|
| 6,424,626 B1 | 7/2002 | Kidambi et al. |
| 7,032,226 B1 | 4/2006 | Nemirovsky et al. |
| 2008/0062879 A1* | 3/2008 | Sivakumar et al. ........... 370/235 |
| 2008/0225728 A1* | 9/2008 | Plamondon .................. 370/237 |

OTHER PUBLICATIONS

Specification of the MC MM MultiNetwork Protocol, [online]; [retrieved on Apr. 9, 2009]; retrieved from the Internet http://www.laas.fr/GCAP/official/GCAP_Multinetwork.doc.
Raj Sharman et al., "Cache Architecture for On-Demand Streaming on the Web"; ACM Transactions on the Web, vol. 1, No. 3, Article 13, Publication date: Sep. 2007. pp. 13:1-13:35.

* cited by examiner

Primary Examiner — Shirley Zhang
(74) Attorney, Agent, or Firm — Cantor Colburn LLP; Steven Chiu (57) ABSTRACT

Methods, systems and computer program product for reducing latency and increasing throughput of data transmissions along a switch network path. Exemplary embodiments include a method in a network accelerator device having a memory buffer, a method including identifying a data transmission, copying data packets from the data transmission into the memory buffer, and in response to at least one of a missing data packet and a corrupt data packet identified during the data transmission, sending a copied data packet corresponding to the at least one of the missing data packet and the corrupt data packet.

20 Claims, 5 Drawing Sheets

PROTOCOLS FOR HIGH PERFORMANCE COMPUTING VISUALIZATION, COMPUTATIONAL STEERING AND FORWARD PROGRESS

BACKGROUND

1. Field

This invention relates to network layer optimization through the use of network accelerator devices (NAD), and particularly to methods, systems and computer program products for enabling reliable packet transmission in a network using a set of network accelerator devices attached to a switch port.

2. Description

High performance computing (HPC) systems are increasingly being deployed in life-critical and mission-critical usage scenarios in addition to traditional scientific computing applications. Computational steering is known in the art and widely deployed to measure HPC application run-time state using software abstractions called 'sensors' and steering the computation state using software 'actuators' to achieve necessary qualities of service or computational convergence. Data input to software 'actuators' can be directly from files, sensor inputs or user input from a graphical visualization screen. Wireless handhelds, appliances and thin clients are increasingly being used in addition to traditional high-end graphics workstations, for the purposes of visualizing and steering computational workloads. HPC applications also consume data from the environment using hardware sensors and can also actuate physical hardware using hardware actuators.

Reliable packet transmission is necessary for data-critical traffic. High-performance computing, distributed database servers, cluster computers and web servers are applications where lossless flow of traffic from one compute node to the other is necessary for application functionality. Additionally, such systems are used in mission critical and life critical applications where reliability is of utmost concern. Data loss can happen because of communication link errors or packet drops in switches with congested links. In large diameter networks, the need for packet retransmissions can significantly increase data transfer time, because in lossless networks unless all the data in a given dataset are received in order, the next stage of the computation cannot proceed. Also, given that links can become congested during application operation, packet retransmissions can be considerably delayed.

SUMMARY

Exemplary embodiments include a method in a network accelerator device having a memory buffer, a method including identifying a data transmission, copying data packets from the data transmission into the memory buffer, and in response to at least one of a missing data packet and a corrupt data packet identified during the data transmission, sending a copied data packet corresponding to the at least one of the missing data packet and the corrupt data packet.

Additional exemplary embodiments include a network accelerator device, including a memory buffer, a process for managing the memory buffer, including instructions for identifying a data transmission, copying data packets from the data transmission into the memory buffer and in response to at least one of a missing data packet and a corrupt data packet identified during the data transmission, sending a copied data packet corresponding to the at least one of the missing data packet and the corrupt data packet.

Further exemplary embodiments include a computer program product for managing a memory buffer in a network device, the computer program product including instructions for causing a computer to implement a method, the method including identifying a data transmission, copying data packets from the data transmission into the memory buffer and in response to at least one of a missing data packet and a corrupt data packet identified during the data transmission, sending a copied data packet corresponding to the at least one of the missing data packet and the corrupt data packet.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

Technical Effects

As a result of the summarized invention, technically we have achieved a solution, which enables reliable data transmission to and from a memory deficient client, and a server using network accelerator devices attached to network switch ports. The invention also enables the notion of "exception caching" and provides the ability to cache client requests closer to the server.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

In exemplary embodiments, the methods, systems and computer program products provide protocols for HPC visualization, computational steering and forward progress. In exemplary embodiments, streams are transmitted from a source node to a destination node. Destinations cumulatively send acknowledgement packets (ACKs) for the source stream packets. ACK packets are transmitted all the way to the source node where the retransmission buffer resides. In exemplary embodiments, the retransmission buffer is moved closer to the destination node to lower retransmission latency and resides directly on an attached network accelerator device (NAD). In exemplary embodiments, the NAD is attached directly to switches. In order to limit resource usage and ease memory needs on the NAD, the retransmission buffer is distributed on the switches from the source node to the destination node. As ACKs are received, memory buffers for ACK-ed packets are released and packets are forwarded from one NAD to another in the path of the stream. This process allows released space to be reclaimed. ACKs propagate in the opposite direction of the original stream path. Such a distribution reduces latency because packets are always retransmitted from the NAD attached closest to the destination node.

As further described herein, the methods, systems and computer program products described herein address the following problems in the HPC application scenarios described above including: the deficient memory resource problem, the latency problem, and the checkpoint problem. With regard to the deficient memory resource problem, unlike high-end workstations, embedded devices like handhelds, thin clients and sensor-to-HPC network interface boards are memory-deficient or lack significant memory resources. This memory deficiency is necessary for lower power, cost and form-factor. Handhelds and thin clients accept data files and data input from touch screens (for example, shrinking the coordinate space by touchscreen in a particle simulation to increase the accuracy of calculated positions) to steer a computation. Data communication for steering computational state provided from a handheld must support reliable packet transmission with retransmission buffers at the application level. Lack of large memory resources limit the number of outstanding data transfers or unacknowledged data input from a handheld. This problem is further compounded when many handhelds communicate with a wireless base-station attached to a HPC network. A similar problem arises in sensor-to-HPC network interface boards. Low memory resources limit the number of unacknowledged data transfers, as memory for retransmission buffers is likely to be small. This problem affects the overall data volume and data throughput communicated from an embedded interface device to the HPC system and network. With regard to the latency problem, in bulk synchronous processing (BSP) HPC computations, a computation round cannot proceed to the next step unless communication activity completes in a BSP super-step (terminated by a barrier). If a packet retransmission is required during communication, the BSP superstep cannot proceed to the next step unless communication activity or packet retransmission completes. In a large diameter network, the latency to re-transmit a packet from the sender to the receiver is likely to block the current BSP superstep and prohibit any forward progress. This latency can affect overall execution time. Similarly, congestion in the network can impact packet retransmission latency and curtail any forward progress of computation. With regard to the checkpoint problem, if there is an instance of time when a retransmission is necessary and at that very instance, the sender node (with generous memory resources) fails (or before the ACK reaches the sender from the destination), the system must use a checkpoint and replay from the last checkpoint even if just one packet was needed for retransmission.

As described herein, exemplary embodiments include methods, systems and computer readable mediums that use network resources to address reliable data transfer in HPC systems and networks. A NAD has a processor, memory, storage and IP network link. A distributed NAD system can be used to offload packet retransmission functions from the computer server. Simply attaching an embedded device to a switch or router node can provide network based reliable packet transmission.

In exemplary embodiments, the methods, systems and computer program products described herein enable reliable packet transmissions in a network (i.e., this can replace retransmission buffers at the sender, augment sender retransmission buffers or serve as a backing store for sender retransmission buffers) using a set of network accelerator devices i.e. devices (with a processor, FPGA, disk and memory) directly attached to a switch port.

In exemplary embodiments, the methods, systems and computer program products described herein implement the notion of "exception caching" as described in exemplary embodiments. As such, if a destination node drops any packets, the missing or corrupted packets can be sourced straight from the NAD rather from the source node, which reduces latency. As such, source data is placed closer to the destination node side. In exemplary embodiments, as the packets are transmitted, the NAD makes copies of the packets without removing the packets from the transmission path or otherwise disrupting the transmission path.

Conventionally, server side data is cached in a conventional cache close to the client. In case the client makes a request for data from the server, the data can be served directly from the conventional cache instead of going to the server. This conventional caching is known as content caching.

Exception caching is introduced in exemplary embodiments, to solve a different problem: to help forward progress of a computation and reduce latency/execution time of a computation. When requests/streams are issued from a client to a server, lack of memory buffers on a server for network I/O, packet error conditions on the server and "root link" conditions (network links attached to a server) may result in corrupt and missing packets on the server, which is likely to happen because the server processes requests from a large number of clients and can easily become a contention point. The exception cache stores all the requests made to the server from clients close to the server. The server can read packets from the exception cache directly than go out to the client, when it lacks memory buffer or encounters an error condition, which reduces latency and improves performance/execution time.

The exception cache stores client request data close to the server in its cache, but the content cache (i.e., the conventional cache) stores server data in its cache. The exception cache completes proxy retransmission requests on behalf of the client. The exception cache helps both the client and server. The exemplary embodiments described herein therefore aid congested servers.

In exemplary embodiments, the methods, systems and computer program products described herein provide assistance in two modes. In a first mode, Model, the NAD acts as a proxy on behalf of the destination node. When packets come in from the source node to the destination node, under normal circumstances, the destination node would ACK received packets to the source node and implicitly/explicitly request retransmission of packets from the source node. In exemplary embodiments, as packets are transmitted, missing packets can be detected by the NAD, and the NAD can act as a proxy to provide a head start for requesting packets from the source node. Furthermore, as the destination node sends ACKs, redundant ACKs are dropped by the NAD. Therefore, the NAD acts as a proxy by making retransmission requests on behalf of the destination node. In exemplary embodiments, the retransmission request can be implicit whereby the NAD ACKs received packets with missing packets lacking ACKs. In exemplary embodiments, the requests can be explicit in which the NAD looks for actual sequence numbers associated with missing packets and explicitly NAKs missing sequence numbers.

In exemplary embodiments, in a second mode of assistance, Mode 2, the NAD also actually makes explicit retransmissions. If a packet is at the destination node and is about to be transferred into the memory of the destination node, the memory of the destination node may be full, there may be an error in transmission, or there can otherwise be a condition in this last link (to the destination) in which the packet is lost. In exemplary embodiments, a NAD attached to the last switch in the transmission path includes a copy of the packets. Therefore, if the destination node misses a packet, the NAD can actually provide the missing packet instead of the source node providing the missing packet.

In exemplary embodiments, the methods, systems and computer program products described herein can include a single NAD configuration and a distributed NAD configuration. In a single NAD configuration, the single NAD can operate in both the two modes described above. In exemplary embodiments, in a distributed NAD configuration, a NAD closest to the destination node can operate in both modes described above, and the remaining NADs operate only in Mode 1 (proxy for destination). However, it is appreciated that in other exemplary embodiments, the other NADs can also operate in both modes. It is further appreciated that when the methods, systems and computer program products described herein implement a single NAD, the network in which the transmissions occur can be either connectionless (i.e., in which the packets are randomly streamed without reserving a path) or connection-oriented (i.e., in which a transmission path is reserved) since the single NAD is not communicating with any other NAD. In exemplary embodiments, as ACKs stream from the destination node, the NAD copies the ACKs. The ACKs make their way back to the source node. In this way, both the source and destination nodes/NADs can release their respective buffers and memory.

In exemplary embodiments, in a distributed configuration, a first path can be considered the path of transmission of packets and a second path can be considered the transmission of ACKs. In exemplary embodiments, for the first path, a destination NAD (NAD attached to switch closest to destination NAD) can include an accrual register flag that when set, accrues packets in memory from the source if memory buffers are available in the destination NAD. When the destination NAD hits a point in which it has accrued enough packets based on memory availability and round-trip time to the nearest upstream NAD, it resets a flag in its accrual register and sets the accrual flag of the upstream NAD. These events allow packets to be accrued in the nearest upstream NAD. This process continues until packets are stored from the destination NAD to the source NAD. In this way, accrual flags in each of the NADs in a distributed system can synchronize to effectively implement all NADs in the distributed system. In exemplary embodiments, for the second path, packets can be considered to have been reached at the destination node. In exemplary embodiments, the NADs can function in distinct ways in response to seeing ACKs. Currently, ACKs can be handled via Go-Back-N and Selective Retry protocols. In exemplary embodiments, the NADs can implement the Go-Back-N protocol. For example, if 10 packets have been transmitted with sequence numbers 1-10, and ACKs are received only for the packet corresponding to sequence number 7, current Go-Back-N retransmits the entire buffer because it assumes that if there were a packet error for one packet, then there could be burst packet errors for all packets in 1-10. In exemplary embodiments, when the destination NAD receives ACKs, the NAD retransmits all packets 1-10 using protocol messages. In another example, implementing the Selective Retry protocol, the NAD only receives the sequence numbers for the missing packets, in this case 1-6, and retransmits the missing packets, 1-6. Once the NAD has sent the selected packets, there are extraneous packets retained for which ACKs were not received. If there are two NADs in the distributed system, NAD1 may include 1-5 and NAD2 may include 6-10. It is appreciated that if ACKs are received for 1-5 on NAD1 then these are released from memory on NAD1 and 6-10 from NAD2 are shifted downstream to NAD1.

In the examples described above, protocol messages are discussed. In exemplary embodiments, protocol messages can be relayed via an overlay network. Alternatively, partition lanes can be established within the network so that there is no interference with packet transmission. For example, the network can be established to include high bandwidth for packet transmission and a smaller secondary network for protocol messages.

Figure 1:
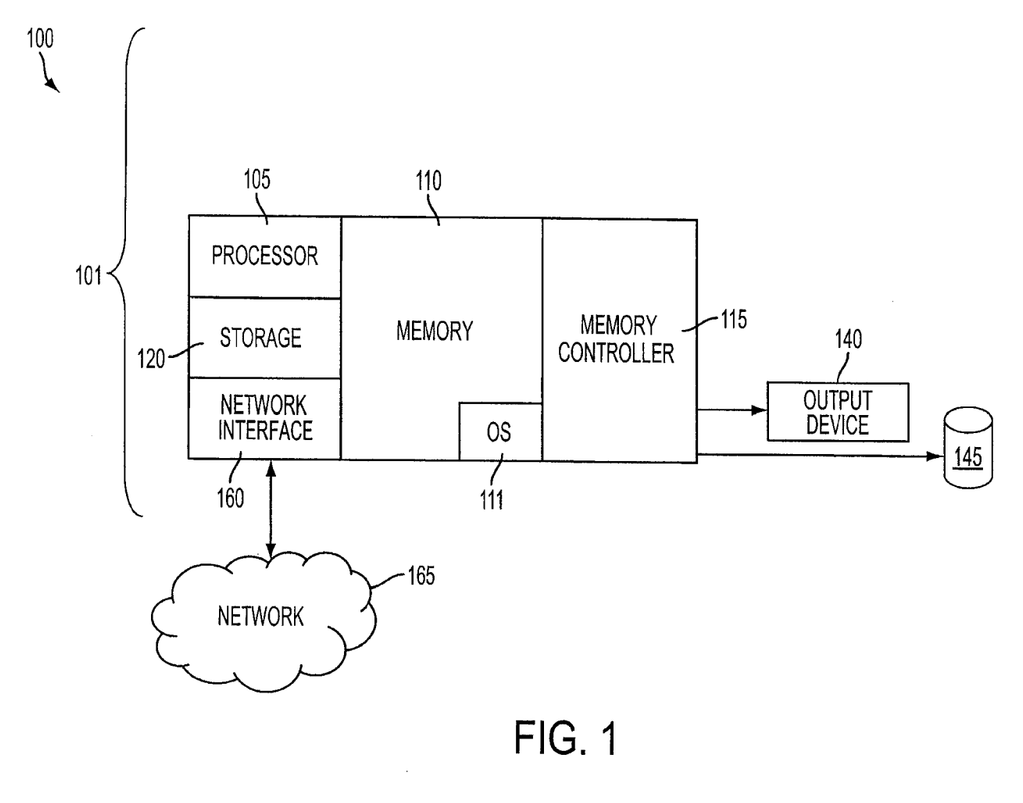
FIG. 1 illustrates a simplified system level block diagram of a network accelerator device for storing data transmission packets sent along a network path in accordance with exemplary embodiments.

FIG. 1 illustrates a simplified system level block diagram of a network accelerator device 100. The methods described herein can be implemented in software (e.g., firmware), hardware, or a combination thereof. In exemplary embodiments, the methods described herein are implemented in software, as an executable program, and is executed by a NAD. The system 100 therefore includes a NAD 101.

In exemplary embodiments, in terms of hardware architecture, as shown in FIG. 1, the NAD 101 includes a processor 105, memory 110 coupled to a memory controller 115, and one or more input and/or output (I/O) devices 140, 145 (or peripherals).

The processor 105 is a hardware device for executing software, particularly that stored in memory 110. The processor 105 can be any custom made or commercially available processor, a central processing unit (CPU), an auxiliary processor among several processors associated with the NAD 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 1, the software in the memory 110 includes the failed component identification and automatic log collection methods described herein in accordance with exemplary embodiments and a suitable operating system (OS) 111. The operating system 111 essentially controls the execution of other computer programs, such the failed component identification and automatic log collection systems and methods described herein, and provides scheduling, input-output control, file and data management, memory management, and communication control and related services.

The network accelerator device attachment to the switch network and identifying and storing of data packets within the NAD memory buffer described herein may be in the form of a source program, executable program (object code), script, or any other entity comprising a set of instructions to be performed. When a source program, then the program needs to be translated via a compiler, assembler, interpreter, or the like, which may or may not be included within the memory 110, so as to operate properly in connection with the OS 111. Furthermore, the network accelerator device, having a memory, methods can be written as an object oriented programming language, which has classes of data and methods, or a procedure programming language, which has routines, subroutines, and/or functions.

In exemplary embodiments, the NAD 101 can further include a network interface 160 for coupling to a network 165. The network 165 can be an IP-based network for communication between the NAD 101 and any external server, client and the like via a broadband connection. The network 165 transmits and receives data between the NAD 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

When the NAD 101 is in operation, the processor 105 is configured to execute software stored within the memory 110, to communicate data to and from the memory 110, and to generally control operations of the NAD 101 pursuant to the software. The failed component identification and automatic log collection methods described herein and the OS 111, in whole or in part, but typically the latter, are read by the processor 105, perhaps buffered within the processor 105, and then executed.

When the methods, systems and computer program products described herein are implemented in software, as is shown in FIG. 1, the methods can be stored on any computer readable medium, such as storage 120, for use by or in connection with any computer related system or method. In the context of this document, a computer readable medium is an electronic, magnetic, optical, or other physical device or means that can contain or store a computer program for use by or in connection with a computer related system or method. The methods described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In exemplary embodiments, where the reliable data transmission optimization system, method and computer readable medium described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array (s) (PGA), a field programmable gate array (FPGA), etc.

Figure 2:
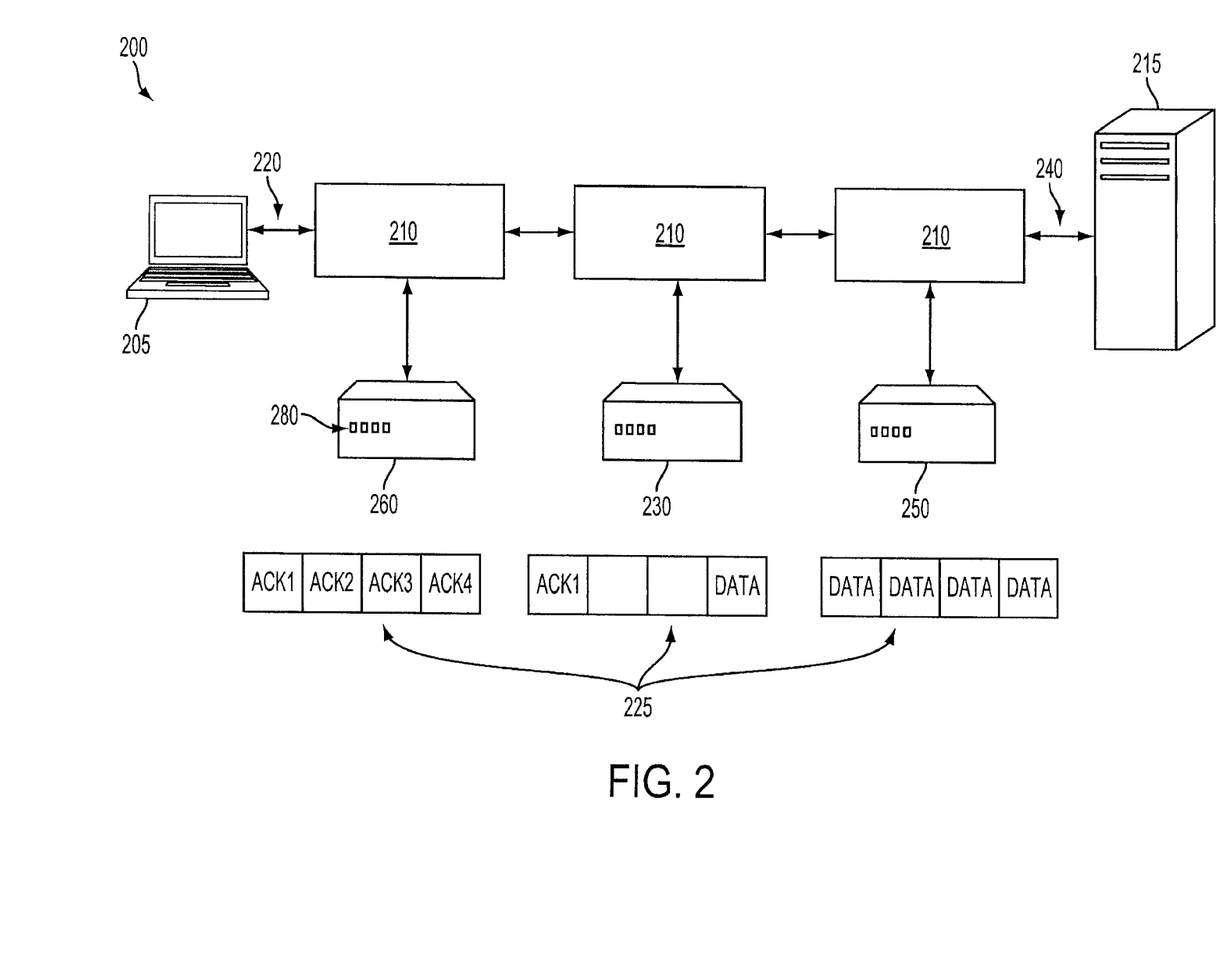
FIG. 2. schematically illustrates a system for buffering data packets in a switch network connecting a source node to a destination node, in a distributed NAD configuration.

As described above, exemplary embodiments include a distributed NAD configuration. FIG. 2. schematically illustrates a system for buffering data packets in a switch network 200 connecting a source node 205 to a destination node 215, in a distributed NAD configuration. In exemplary embodiments, the source node 205 can be any computing device including but not limited to a computer, phone and personal data assistant (PDA). In the switch network 200, streams of data packets 220 are transmitted from a source node 205 to a destination node 215. Destination nodes 215 cumulatively send acknowledgement packets (ACK) 240 to acknowledge receipt of these source node stream packets. ACK packets are transmitted all the way to the source node where the retransmission buffer resides. In exemplary embodiments, the retransmission buffer is moved closer to the destination node to lower retransmission latency and resides directly on the NAD 250. The NAD is attached directly to switches 210. In order to limit resource usage and ease memory needs on the NAD, the retransmission buffer is distributed on the switches from the source node to the destination node 215. As ACKs are received, memory buffers for ACKed packets are released in NAD 250 with packets being forwarded from one NAD to another as described previously. This process allows released space to be reclaimed. ACKs propagate in the opposite direction of the packets in the distributed buffer when ACKs release buffers. Such a distribution reduces latency because packets are always retransmitted from the NAD 250 attached closest to the destination node.

In exemplary embodiments, the NAD 250 is attached to switches 210 in the interconnection network 200. Packets are transmitted 220 from the source node 205 to the destination node 215. As packets are transmitted from the source to the destination, a copy of the packet is stored in the NAD 250 attached to the switch.

In exemplary embodiments, NADs can be interconnected in the following ways: 1) using regular data network (along with data traffic); 2) using regular data network with special virtual channel for retransmission; and 3) using regular data network with special retransmission network.

If a packet is missing, the NAD does a proxy retransmission request on behalf of the destination node to the source node (cumulatively for performance). The NAD may do a selective retransmission request to the source node or may perform a Go-back-N retransmission if required by the destination node. Packets are stored in a distributed set of NADs 260, 230 and 250 from the source compute node to the destination compute node. This process eases the burden on the NAD directly attached to the destination compute node. Packets flow from the source to destination NAD, while ACKs flow from destination to source. The NAD closest to the destination node is called the destination NAD 250 and the NAD closest to the source is called source NAD 260. In exemplary embodiments, each switch 210 from the source to destination can be attached with NADs or selected switches can be attached with NADs. The number of NADs requiring attachment is dependent on the memory capacity of each NAD.

Figure 3:
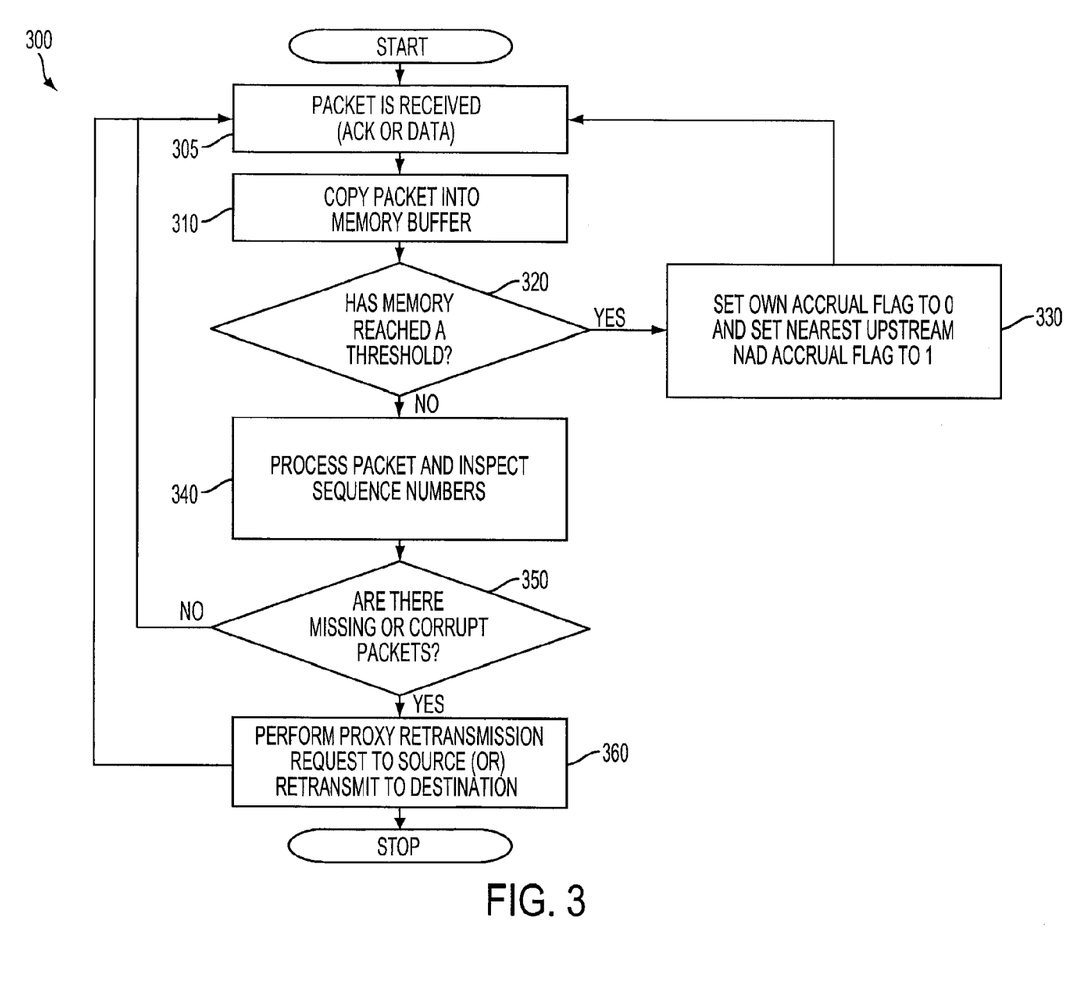
FIG. 3 illustrates a flow chart of a method for storing data packets in a network accelerator device along a switched network performing proxy retransmission requests and actual data packet retransmissions in a distributed NAD configuration.

FIG. 3 illustrates a flow chart of a method 300 for storing data packets in a network accelerator device along a switched network and performing proxy retransmissions in a distributed NAD configuration. In exemplary embodiments, when a packet transmission at block 305 begins, the destination NAD is filled with packets first at block 310 until it reaches the buffer size allowed in the retransmission buffer 280. When this happens, all NADs except the destination NAD have their accrual flags A set to 0. The destination NAD has its accrual flag A set to 1 when packet transmission begins. When the destination NAD buffers are filled at block 320 or reach a certain threshold, the next neighboring NAD upstream from the destination NAD is filled with buffers at block 330. For this case, the accrue flag A for the upstream NAD has to be set at block 330, in which case, the NAD sets its own accrual flag to zero and sets the nearest upstream NAD accrual flag to 1. At this point, the immediately upstream NAD can now copy packets into buffers. In exemplary embodiments, a number of policies to set accrual flags for upstream NADs can be developed. If the memory is not full at block 320, the NAD inspects packets and sequence numbers at block 340 as they are received. Furthermore, the NAD determines if there are missing or corrupt packets at block 350. If there are no missing or corrupt packets at block 350, then the NAD receives the next packet at block 305. However, if there are missing or corrupt packets at block 350, then the NAD makes proxy retransmission requests at block 360 (on behalf of the destination node) to the source node corresponding to the missing or corrupt packet. In this scenario, a number of policies are possible. The NAD can make a selective request when missing packets are noticed or can make a batched request. Furthermore, a NAD overlay network can be used to isolate NAD protocol messages. Retransmitted packets can also be transmitted on the NAD overlay network when low-latency is required or deadlines have to be met. In an alternative scenario, the NAD makes proxy retransmissions on behalf of the source node when the destination so requires.

With regard to the following problems in the HPC application scenarios described above including: the deficient memory resource problem, the latency problem, and the checkpoint problem, the methods, systems and computer program products described herein address the problems as now described. Regarding the deficient memory resource problem, the methods, systems and computer program products described herein provide support for retransmission buffers 280 in the network to increase, replace or backup device/compute node retransmission buffers. Handhelds or thin clients without any memory 205 can use the NAD closest to the sender 260 as a retransmission buffer repository. In exemplary embodiments, the source NAD will be used to store packets from thin clients and wireless handhelds and function as a retransmission backing store and ease the memory burden on the thin client. These features also offload ACK and retransmission buffer processing from the sender node. With regard to the latency problem, the retransmission request is always served from the switch/NAD closest to the destination node 215. This switch/NAD also processes ACK packets. With regard to the checkpoint problem, the retransmission request can be served from the nearest switch and the computation can proceed without the need to replay from the last checkpoint.

Figure 4:
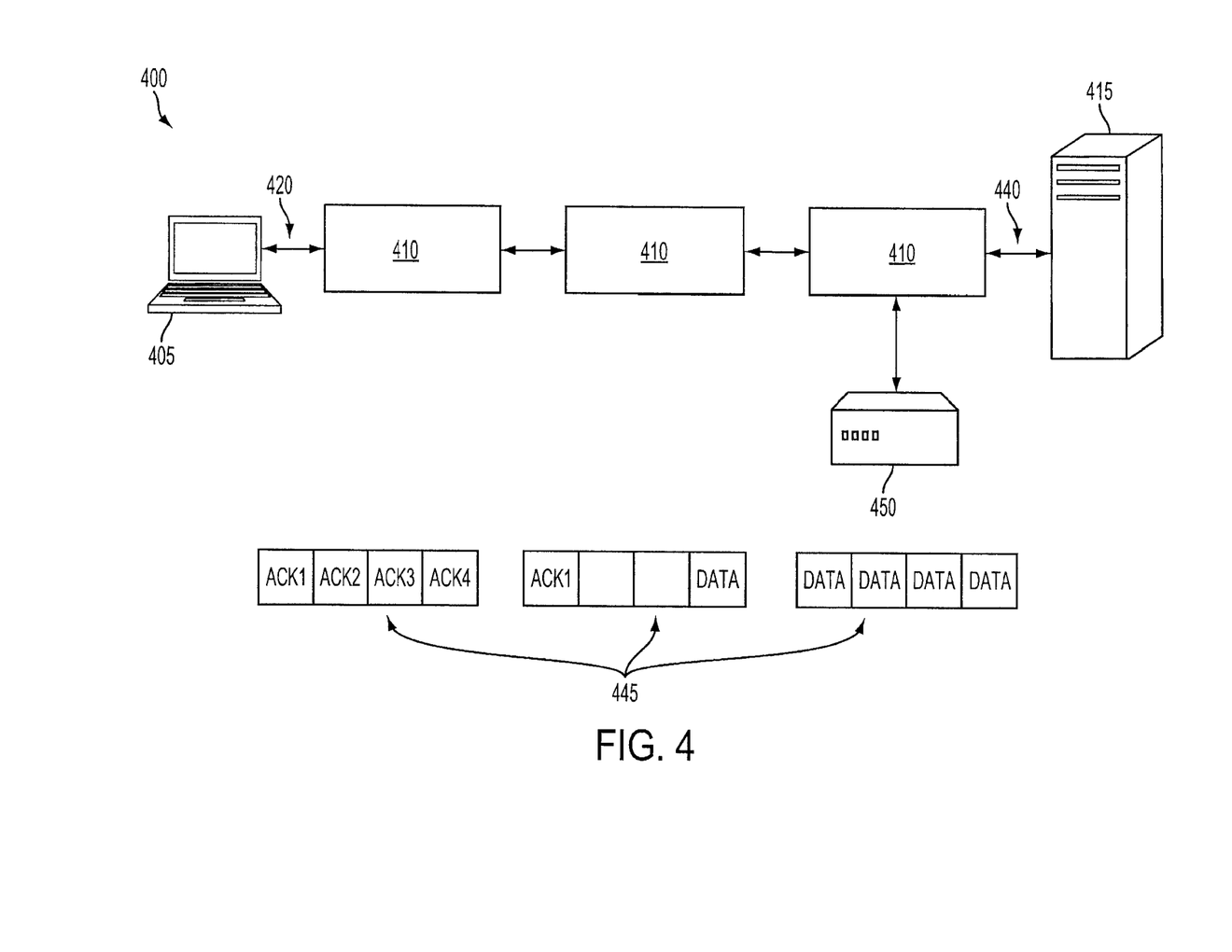
FIG. 4. schematically illustrates a system for buffering data packets in a switch network connecting a source node to a destination node, in a single NAD configuration.

As described above, exemplary embodiments also include a single NAD configuration. FIG. 4. schematically illustrates a system for buffering data packets in a switch network 400 connecting a source node 405 to a destination node 415, in a single NAD configuration. In exemplary embodiments, the source node 405 can be any computing device including but not limited to a computer, phone and personal data assistant (PDA). In the switch network 400, streams of data packets 420 are transmitted from a source node 405 to a destination node 415. Destination nodes 415 cumulatively send acknowledgement packets (ACK) 440 to acknowledge receipt of these source node stream packets. ACK packets are transmitted all the way to the source node where the retransmission buffer resides. In exemplary embodiments, the retransmission buffer is moved closer to the destination node 415 to lower retransmission latency and resides directly on the NAD 450. The NAD 450 is attached directly to switches 410.

In exemplary embodiments, the NAD 450 is attached to switches 410 in the interconnection network 400. Packets are transmitted 420 from the source node 405 to the destination node 415. As packets are transmitted from the source to the destination, a copy of the packet is stored in the NAD 450 attached to the switch.

However, in this single NAD configuration, the NAD 450 is referred to as an exception cache. As described herein, if the destination node 415 drops any packets, the missing or corrupted packets can be sourced straight from the NAD 450 rather from the source node 405, which reduces latency. As such, source data is placed closer to the destination node side. In exemplary embodiments, as the packets are transmitted, the NAD 450 makes copies of the packets without removing the packets from the transmission path or otherwise disrupting the transmission path. In exemplary embodiments, exception caching helps forward progress of a computation and reduce latency/execution time of a computation. When requests/streams are issued from the source node 405 to a destination node 415, lack of memory buffers on the destination node 415, packet error conditions on the server and "root link" (network link attached to destination server) conditions may result in corrupt and missing packets on the destination node 415, which is likely to happen because the destination node 415 processes requests from a large number of clients, such as the source node 405, and can easily become a contention point. The NAD 450 as an exception cache stores all the requests made to the destination node 415. The destination node 415 can read packets from the exception cache (the NAD 450) directly than go out to the source node 405, when it lacks memory buffers or encounters an error condition, which reduces latency and improves performance/execution time. As such, the NAD 450 stores client request data close to the server in its cache, but the content cache (i.e., the conventional cache) stores server data in its cache near the client. The exception cache completes proxy retransmission requests on behalf of the destination to the source. The exception cache helps both source and destination nodes 405, 415. The exemplary embodiments described herein therefore aids congested servers/destinations.

Figure 5:
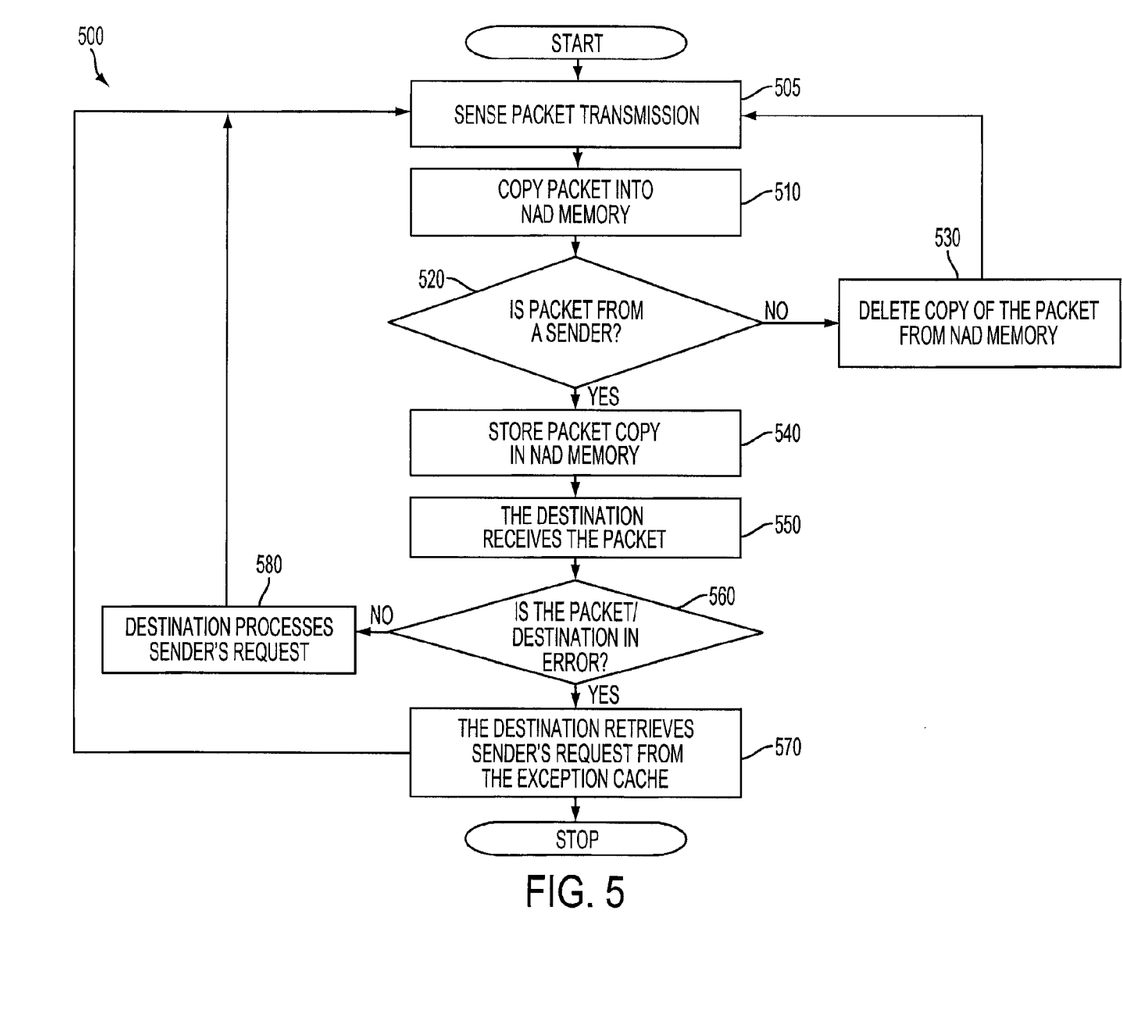
FIG. 5 illustrates a flow chart of a method for storing data packets in a network accelerator device along a switched network and performing proxy retransmissions in a single NAD configuration.

FIG. 5 illustrates a flow chart of a method 500 for storing data packets in a network accelerator device along a switched network and performing proxy retransmissions in a single NAD configuration. In exemplary embodiments, at block 505, the NAD 450 senses a packet transmission. At block 510, the NAD 450 makes a copy of packet in NAD memory (e.g., see memory 110 in FIG. 1). At block 520, the NAD 450 determines if the packet is from the sender. If the packet is not from a sender at block 520, then the copy of the packet in the NAD memory is deleted and the process begins again at block 505. If the packet is from the sender at block 520, then the packet is stored in NAD memory at block 540. At block 550, the destination node 415 then receives the packet. It will be noted that the packet from the source is not removed from the network link but only a copy is made in NAD memory. At block 560, the destination system 415 determines if the packet or destination has an error. If there is an error at block 560, then the destination node 415 retrieves the packet from the NAD 450 (i.e., the exception cache) at block 570. If there is no error at block 570, then the destination node 450 processes the senders request at block 580. If there are more packets sensed at block 505, then the process continues. In exemplary embodiments, the NAD 450 in FIG. 4 can also make retransmission requests on behalf of the destination to the source upon missing/corrupt packets from the source. This is similar to the functioning of the NAD 250 in FIG. 2.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, executed concurrently or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. In a network accelerator device (NAD) having a memory buffer and residing between a source node and a destination node, a method comprising:
   identifying a data transmission between the source node and the destination node, the NAD being closer in proximity to the destination node as compared to the source node, the NAD further being out of a direct transmission path between the source and destination nodes, the data transmission including a plurality of original data packets sent from the source node to the destination node;
   copying the plurality of data packets from the data transmission into the memory buffer, such that a plurality of copied data packets resides in the memory buffer separate from the source and destination nodes, wherein the plurality of data packets are copies without removing the plurality of data packets from the direct transmission path thereby creating no interference in the direct transmission path;
   storing data transmission requests between the source node and the destination node; and
   in response to at least one of a missing data packet and a corrupt data packet identified during the data transmission due to packet error conditions related to the data transmission requests between the source node and the destination node, implementing exception caching by sending, directly to at least one of the source node and the destination node, a copied data packet from the plurality of copied data packets, corresponding to the at least one of the missing data packet and the corrupt data packet.

2. The method as claimed in claim 1 further comprising performing a proxy retransmission request.

3. The method as claimed in claim 2 wherein the proxy retransmission request is performed in response to at least one of a missing and corrupt data packet related to the data transmission.

4. The method as claimed in claim 1 further comprising receiving additional data packets and ACKs into the memory buffer.

5. The method as claimed in claim 4 further comprising detecting that the memory buffer has reached at least one of a threshold and become full.

6. The method as claimed in claim 5 wherein the memory buffer includes an accrual flag configured to be set to 0 and 1.

7. The method as claimed in claim 6 further comprising in response to the memory buffer at least one of becoming full and reaching a threshold, setting the accrual flag from 1 to 0.

8. The method as claimed in claim 1 further comprising releasing a memory buffer corresponding to a packet in response to receiving an ACK packet.

9. A network accelerator system residing between a source node and a destination node, the system comprising:
   a processor:
   a network accelerator device (NAD) having a memory buffer operatively coupled to the processor;
   a process residing in the processor for managing the memory buffer, including instructions for causing the process to implement a method including:
      identifying a data transmission between the source node and the destination node, the NAD being closer in proximity to the destination node as compared to the source node, the NAD further being out of a direct transmission path between the source and destination nodes, the data transmission including a plurality of original data packets sent from the source node to the destination node;
      copying the plurality of data packets from the data transmission into the memory buffer, such that a plurality of copied data packets resides in the memory buffer separate from the source and destination nodes, wherein the plurality of data packets are copies without removing the plurality of data packets from the direct transmission path thereby creating no interference in the direct transmission path;

storing data transmission requests between the source node and the destination node; and in response to at least one of a missing data packet and a corrupt data packet identified during the data transmission due to packet error conditions related to the data transmission requests between the source node and the destination node, implementing exception caching by sending, directly to at least one of the source node and the destination node, a copied data packet from the plurality of copied data packets, corresponding to the at least one of the missing data packet and the corrupt data packet.

10. The system as claimed in claim 9 further comprising an accrual flag residing in the memory buffer, the accrual flag configured to be set from 1 to 0 in response to at least one of the memory buffer becoming full and reaching a threshold.

11. The system as claimed in claim 9 wherein the process further includes instructions for performing a proxy retransmission request.

12. The system as claimed in claim 9 wherein the process further includes instructions for performing a proxy retransmission request, wherein the proxy retransmission request is performed in response to at least one of a missing data and corrupt packet related to the data transmission.

13. A computer program product for managing a memory buffer in a network device (NAD) disposed between a source node and a destination node, the computer program product including a non-transitory computer readable medium storing instructions for causing a computer to implement a method, the method comprising:

identifying a data transmission between the source node and the destination node, the NAD being closer in proximity to the destination node as compared to the source node, the NAD further being out of a direct transmission path between the source and destination nodes, the data transmission including a plurality of original data packets sent from the source node to the destination node;

copying the plurality of data packets from the data transmission into the memory buffer, such that a plurality of copied data packets resides in the memory buffer separate from the source and destination nodes, wherein the plurality of data packets are copies without removing the plurality of data packets from the direct transmission path thereby creating no interference in the direct transmission path;

storing data transmission requests between the source node and the destination node; and in response to at least one of a missing data packet and a corrupt data packet identified during the data transmission due to packet error conditions related to the data transmission requests between the source node and the destination node, implementing exception caching by sending, directly to at least one of the source node and the destination node, a copied data packet from the plurality of copied data packets, corresponding to the at least one of the missing data packet and the corrupt data packet.

14. The computer program product as claimed in claim 13 wherein the method further comprises performing a proxy retransmission request.

15. The computer program product as claimed in claim 14 wherein the proxy retransmission request is performed in response to at least one of a missing and corrupt data packet related to the data transmission.

16. The computer program product as claimed in claim 13 wherein the method further comprises receiving additional data packets and ACKs into the memory buffer.

17. The computer program product as claimed in claim 16 wherein the method further comprises detecting that the memory buffer has at least one of reached a threshold and become full.

18. The computer program product as claimed in claim 17 wherein the memory buffer includes an accrual flag configured to be set to 0 and 1.

19. The computer program product as claimed in claim 18 wherein the method further comprises in response to at least one of the memory buffer becoming full and reaching a threshold, setting the accrual flag from 1 to 0.

20. The computer program product as claimed in claim 13 wherein the method further comprises releasing a memory buffer corresponding to a data packet in response to receiving an ACK packet.

* * * * *